May 21, 1935.   R. RÖMER   2,001,852
ILLUMINATING ELEMENT
Filed Feb. 20, 1933
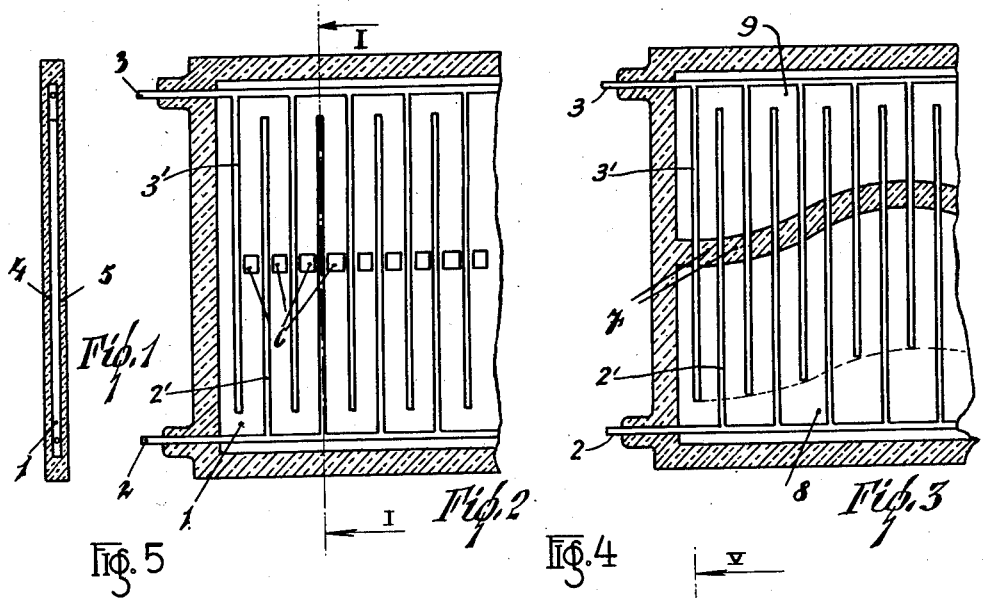
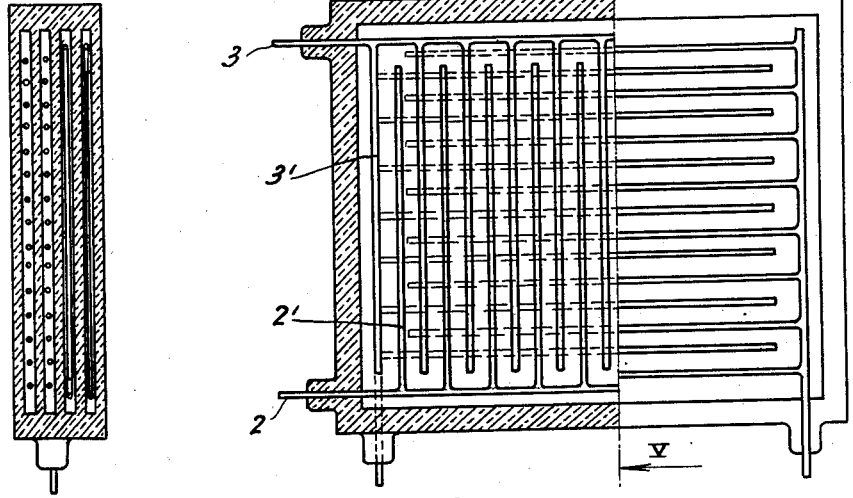
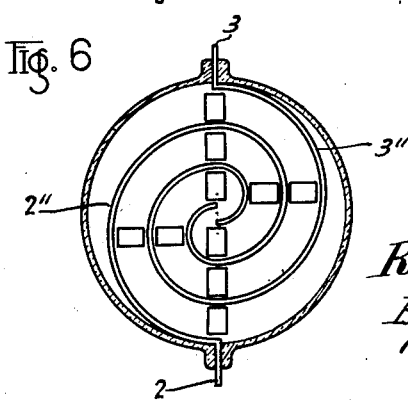
Inventor:
Raoul Römer
By Albert Jacowich
Attorney.

Patented May 21, 1935

2,001,852

UNITED STATES PATENT OFFICE 2,001,852

ILLUMINATING ELEMENT

Raoul Römer, Biel, Switzerland

Application February 20, 1933, Serial No. 657,662

3 Claims. (Cl. 176—122)

This invention relates to an illuminating element with at least one illuminating chamber containing at least two electrodes, characterized in that the illuminating chamber is constructed like a plate and the electrodes are arranged within the illuminating chamber in such a manner that almost the entire illuminating chamber is capable of producing light.

Several embodiments of the invention are illustrated by way of example in the accompanying drawing in which:—

Fig. 1 shows in section on line I—I of Fig. 2 an illuminating element with only one illuminating chamber.

Fig. 2 is a front elevation of Fig. 1.

Fig. 3 is a front elevation of an illuminating element with two illuminating chambers situated in the same plane.

Fig. 4 shows in front elevation partly in section an illuminating element with four superposed illuminating chambers.

Fig. 5 is a section on line V—V of Fig. 4.

Fig. 6 shows in elevation an illuminating element with only one illuminating chamber and flat spiral electrodes.

The illuminating element illustrated in Figs. 1 and 2 has an input electrode 2 and an output electrode 3 in a plate shaped illuminating chamber 1. The electrodes are branched as at 2', 3' in the chamber in such a manner that at least approximately the whole of the chamber becomes luminous. If the neighbouring boundary faces 4 and 5 are to be protected against being pressed in by atmospheric pressure, owing to the vacuum prevailing in the illuminating chamber, elements 6 are provided which support the two surfaces 4 and 5 and are secured to one of said surfaces. The elements 6 may be employed for spacing the electrodes or at the same time for spacing the electrodes and supporting the surfaces 4 and 5. At least one of the electrodes may also serve for supporting the surfaces 4 and 5.

The illuminating chamber of the illuminating element shown in Fig. 3 is divided into two separate chambers 8 and 9 by a partition 7. If the two chambers are filled with different gases or if the wall is arranged in a special manner a certain light effect can be obtained.

By superposing two or more illuminating chambers as in the example illustrated in Figs. 4 and 5 certain light effects can be obtained even with relatively small total thickness.

Certain light effects or advantages may also be obtained by the special arrangement or shaping of the electrodes, as in the example illustrated in Fig. 6 in which the electrodes are arranged in the form of flat spirals 2", 3", the convolutions of each of which are spaced from those of the other.

It is for example advisable to arrange at least two electrodes at least partly parallel. For illuminating elements of circular shape it is advisable to arrange the electrodes in flat spiral shape. It is possible to make the electrodes of oblong cross-section, it being advisable to arrange the narrow side of the cross-section towards the two neighbouring surfaces 4 and 5.

The plate shaped illuminating compartments may evidently be employed for producing a composite or irregular illuminating element, for example for conical and cylindrical elements and the like and also for certain superficial illustrations, such as letters and the like.

I claim:—

1. An illuminating element comprising a flat glass housing having two opposite flat walls, a chamber between said walls, and electrodes in said chamber between said walls and spaced apart to form a flat discharge field situated in a plane parallel to the said walls, one of said electrodes having laterally extended branches arranged in a row and spaced apart.

2. An illuminating element comprising a flat glass housing having two opposite flat walls, a chamber betweeen said walls, and electrodes in said chamber between said walls and spaced apart to form a flat discharge field situated in a plane parallel to the said walls, each of said electrodes having laterally arranged branches spaced apart and arranged in a row, the branches of each electrode being arranged between and in spaced relation to the branches of the other electrode.

3. An illuminating element comprising a flat glass body having flat opposite walls, a chamber between said walls and a pair of electrodes in said chamber, said electrodes being arranged in flat spirals, the convolutions of one electrode arranged between and spaced from those of the other electrode.

RAOUL RÖMER.